United States Patent
Gitter et al.

[19]

[11] Patent Number: 5,855,520
[45] Date of Patent: Jan. 5, 1999

[54] OPTICAL ENTERTAINMENT SYSTEM

[75] Inventors: Dean L. Gitter, Mt. Pleasant; Kenneth B. Graham, Mt. Tremper, both of N.Y.

[73] Assignee: Kaatskill Kaleidoscope Ventures, LLC, Mt. Tremper, N.Y.

[21] Appl. No.: 888,200

[22] Filed: Jul. 3, 1997

Related U.S. Application Data

[60] Provisional application No. 60/021,660 Jul. 12, 1996.

[51] Int. Cl.⁶ .................................................. A63G 31/00
[52] U.S. Cl. .............................................. 472/63; 472/136
[58] Field of Search ................................ 472/57, 60, 63, 472/136; 359/616, 617; 353/119, 122

[56] References Cited

U.S. PATENT DOCUMENTS

| | | |
|---|---|---|
| 801,669 | 10/1905 | Maxim . |
| 1,518,204 | 9/1924 | Husted . |
| 1,712,431 | 4/1929 | Hadley . |
| 1,968,759 | 7/1934 | Gill et al. . |
| 2,099,904 | 11/1937 | Pennington et al. . |
| 2,173,162 | 9/1939 | Gilluly . |
| 2,280,206 | 4/1942 | Waller et al. . |
| 2,757,570 | 8/1956 | Molnar . |
| 2,912,244 | 11/1959 | Carr .......................................... 472/60 |
| 3,420,605 | 1/1969 | Kipping . |
| 3,468,533 | 9/1969 | House, Jr. ................................. 472/60 |
| 3,469,837 | 9/1969 | Heilig . |
| 4,790,527 | 12/1988 | Browning . |
| 5,241,418 | 8/1993 | Doak . |

*Primary Examiner*—Kien T. Nguyen
*Attorney, Agent, or Firm*—Jones, Tullar & Cooper, PC

[57] ABSTRACT

An entertainment system includes a viewing chamber of sufficient size to accommodate a relatively large number of viewers, and a large kaleidoscope having a viewing end opening to the chamber. The kaleidoscope is sufficiently large to enable everyone in the viewing chamber to have an unobstructed view of the kaleidoscope display. The system includes a sound system which is coordinated with the optical display. In one embodiment, the viewing chamber and the kaleidoscope are located in a conventional silo, with the kaleidoscope extending vertically above the chamber.

15 Claims, 5 Drawing Sheets

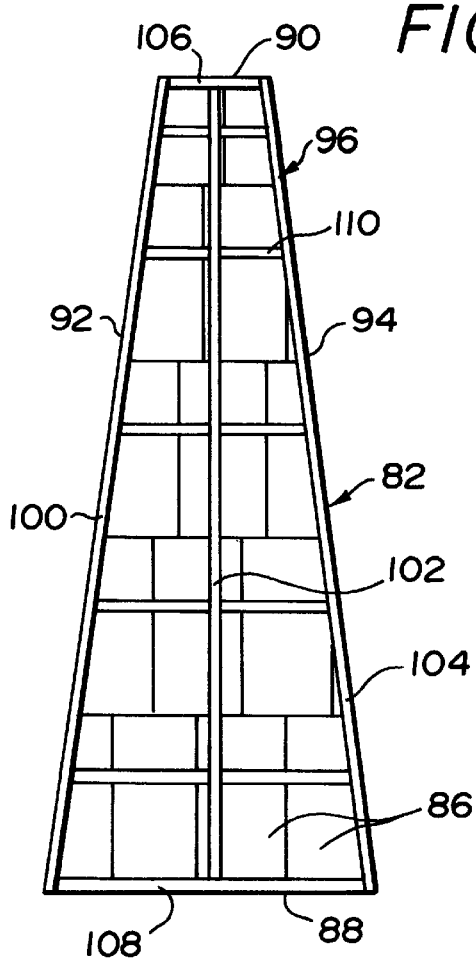
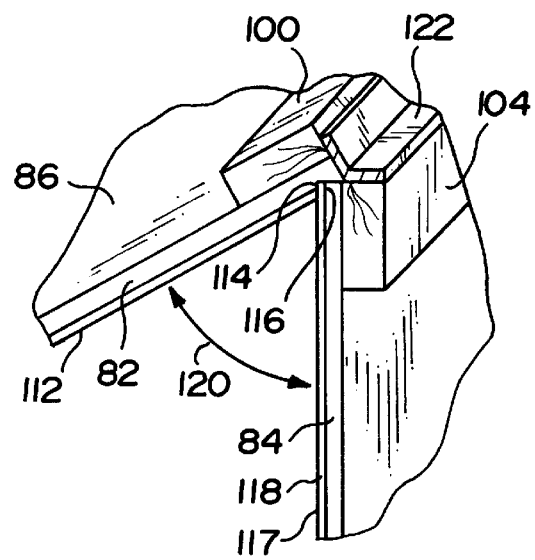
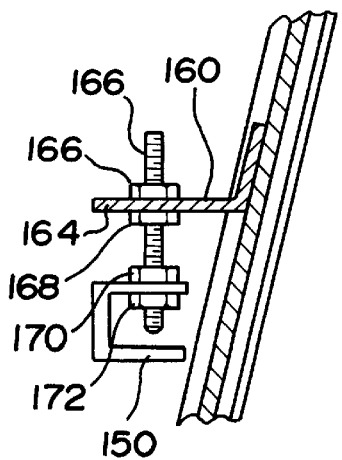
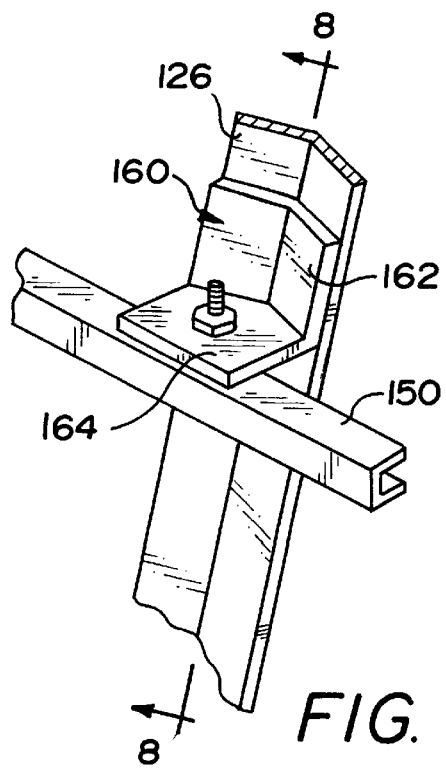

OPTICAL ENTERTAINMENT SYSTEM

This application claims the benefit of U.S. provisional Ser. No. 60/021,660, filed Jul. 12, 1996, the disclosure of which is hereby incorporated herein by reference.

The present invention relates, in general, to entertainment structures and apparatus, and more particularly to an optical display system incorporating a very large kaleidoscope in combination with a viewing chamber capable of receiving a large number of viewers.

A sound system is incorporated in the kaleidoscope apparatus and is coordinated with the optical display for producing a unique and entertaining viewing environment. The invention relates still more particularly to a structure for producing a large, precision optical system for viewing large-scale kaleidoscopic images.

BACKGROUND OF THE INVENTION

The kaleidoscope is an optical device which was invented by David Brewster in 1817. In its simplest form, a kaleidoscope includes a cylinder in which two reflective strips extend longitudinally, with the strips being at an angle. The near end of the cylinder has a cover provided with a central viewing hole, while the far end of the cylinder is closed by two spaced disks between which small colored objects are loosely located. The innermost disk is transparent while the outermost disk is translucent so the light can enter the far end of the cylinder opposite the viewing hole. Colored objects between the disks and within the angle between the reflective strips are viewed directly as a primary image, while simultaneously an angular array of images reflected is produced.

Innumerable variations in the objects to be viewed and in the enclosures for receiving the objects have been developed over the intervening years, and the popularity of kaleidoscopes has grown. Small, hand-held kaleidoscopes viewable by individuals are typical, but attempts have been made to produce larger versions suitable for multiple viewers, as described, for example, in U.S. Pat. No. 4,725,135 to Browning. However, difficulties have been encountered in producing larger versions, for the optical requirements for very large kaleidoscopes are difficult to meet. Thus, prior art devices have not achieved the very large dimension needed for a kaleidoscope that can be viewed by many people together while maintaining optical integrity. Thus, as the popularity of kaleidoscopes has grown, the need for an improved viewing experience has grown, and the present invention has been developed to meet that need.

SUMMARY OF THE INVENTION

It is, therefore, an object of the present invention to provide an extremely large kaleidoscope having an optical system on the order of 40 ft. in length and 15–20 ft. in diameter to provide a unique display for a large number of viewers.

It is another object of the invention to provide an optical system which utilizes a large-diameter, elongated viewing tube for a kaleidoscope wherein the viewing tube incorporate a precisely-aligned structure to enable large mirrors to provide clear and distortion-free kaleidoscopic images.

Still another object of the invention is to provide an optical system for a kaleidoscope having a large viewing tube consisting of two or more reflective walls precisely joined along adjacent walls having lengths on the order of 40 ft. to provide a seamless, precise and clear reflection of a kaleidoscopic image.

A further object of the invention is to provide an optical system for a very large kaleidoscope entertainment system which accommodates multiple viewers of kaleidoscopic images.

A still further object of the invention is to provide an entertainment system incorporating a viewing room adjoined to a very large kaleidoscope tube having optical imaging with precision optics in the tube for a clear and distortion-free view of the optical display.

Another object of the invention is to provide an entertainment system having a viewing room, a vertical kaleidoscope tube mounted over the viewing room, precision optics in the tube to provide seamless kaleidoscopic images and incorporating a sound system cooperating with the optical image to provide a three-dimensional entertainment environment for multiple viewers.

Briefly, the present invention consists of an entertainment system which includes a viewing room of sufficient size to accommodate a number of people for observing an audio-visual display. The room may be generally cylindrical, hexagonal, or any desired shape and has a central open space for accommodating multiple viewing stations. These viewing stations may be chairs or may be recliner supports which allow viewers to comfortably watch an optical kaleidoscopic display. In one embodiment, the recliner supports are arranged to allow viewers to lean against a support and rest their heads on adjustable cushions to comfortably look upwardly toward an overhead kaleidoscopic display. The invention incorporates a sound system for directing music and other sounds coordinated with the displayed images into the viewing room.

In accordance with the invention, a large kaleidoscope tube is provided, the tube having a viewing end which is adjacent to and opens into the viewing room. The viewing end is sufficiently large to enable all the people in the room to have an unobscured view of an optical display at an object end of the tube. The tube preferably has three flat reflective walls which are trapezoidal in shape and joined edge-to-edge to produce a tube which is triangular in cross-section and tapered from a large viewing end inwardly toward a smaller display end. In one embodiment of the invention which has been constructed, the tube is circumscribed by a cylindrical housing having a diameter of about 17½ ft. to accommodate the large end of the kaleidoscope tube. This tube is mounted vertically over the viewing room and is supported within the housing which in this case is a conventional concrete silo.

In accordance with the invention, each of the mirrored walls of the viewing tube is fabricated from multiple mirrored panels which are secured to the surface of corresponding rigid backings such as tongue and groove plywood panels supported by a rigid frame. The tongue and groove panels permit aligned, rigid joints between adjacent mirrored panels to form clear, undistorted mirrored walls. In the above-described example of the system of the invention, each wall is a flat mirrored trapezoidal surface which is 37½ ft. long and which tapers inwardly from a base 15 ft. wide to a top edge 5 ft. wide.

The fabrication of mirrored walls of this size and the construction of an optically acceptable viewing tube from such walls is not only difficult, but is essential to the success of the kaleidoscope. Thus, in accordance with the invention, the three walls of the tube preferably are fabricated separately and then assembled into a generally tubular, tapered structure having a triangular cross section. Since the angles between adjacent mirrored walls must be precise over the full length of the tube in order to produce the appropriate kaleidoscopic image, the mirror walls are secured at precise angles by angled support braces which adjoin and secure adjacent walls at their abutting edges. Furthermore, the edges of the adjacent mirrored surfaces must abut precisely along the entire length of each mirror wall to provide an optically seamless joint to prevent distortions and spaces in the optical image, and for this purpose the abutting edges of adjacent mirrored walls are grooved to provide precise abutting alignment, and are held in that alignment by the angled support braces. In addition, each of the mirrored walls is supported by framing members which secure the adjacent panels of each wall together in edge-to-edge alignment and produce rigidity in each wall.

The precisely fabricated mirror tube is then adjustably mounted in its support housing to permit it to be aligned and to maintain the mirror alignment over a long period of time, through temperature changes, vibrations due to traffic, and other environmental problems. In the above-identified embodiment, the viewing tube is secured vertically within a silo-like housing with the axis of the tube being coaxial with the axis of the housing. Cross-beams are provided in the housing to receive support beams on which the tube rests by means of support brackets secured to the angled support braces which extend along the length of abutting walls.

The optical display at the image end of the kaleidoscope tube may be provided by projecting an image onto a translucent surface covering the open object end of the tube. A projection television, for example, may be used to provide the optical display, but other sources of an optical image may also be utilized.

BRIEF DESCRIPTION OF THE DRAWINGS

The foregoing, and additional objects, features and advantages of the present invention will become apparent to those of skill in the art from the following detailed description of a preferred embodiment thereof, taken in conjunction with the accompanying drawings, in which:

FIG. 5 is a plan view of the exterior surface of a mirror wall;

FIG. 6 is an enlarged view of the longitudinal joint between adjacent mirror walls of the kaleidoscope tube illustrated in FIGS. 2, 3, 4 and 5;

FIG. 7 is an enlarged perspective view of a support bracket for the kaleidoscope of the invention; and FIG. 8 is a cross-sectional view of the support bracket, taken along line 8—8 of FIG. 7.

DESCRIPTION OF PREFERRED EMBODIMENT

Figure 1:
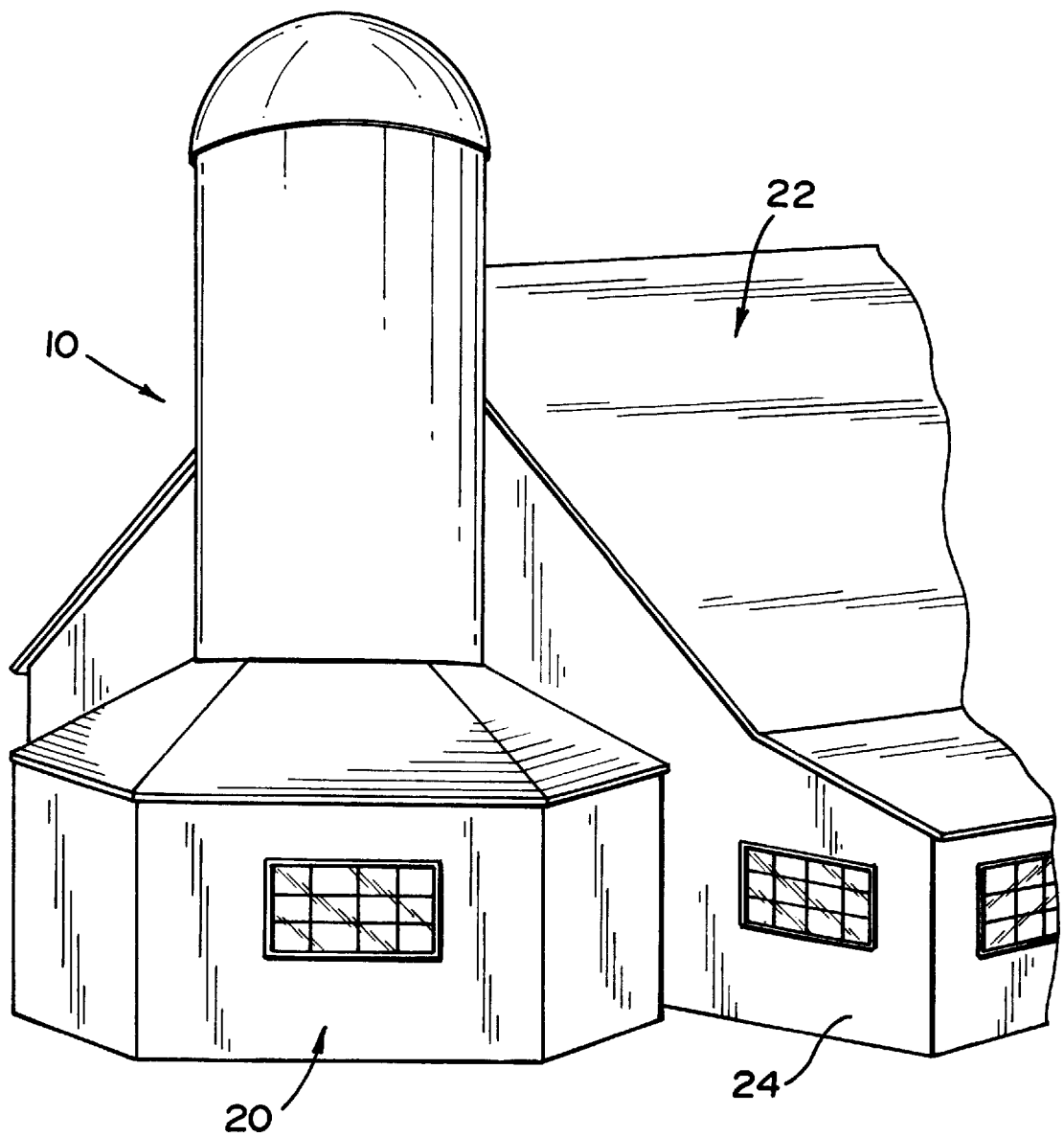
FIG. 1 is a diagrammatic illustration of a building complex incorporating the optical entertainment system of the present invention.

One embodiment of an optical entertainment system 10 constructed in accordance with present invention is illustrated in FIGS. 1–4, wherein a kaleidoscope generally indicated at 12 is located in a generally cylindrical support housing 14. In this embodiment, the housing is a conventional concrete silo having a generally cylindrical sidewall 16 with a vertical axis, although it should be understood that other orientations of the housing, and thus of the kaleidoscope 12, may be utilized. The housing 14 may be covered on its interior surface with a layer of R-30 spray foam insulation 18. The entertainment system 10 incorporates, in this embodiment, adjoining buildings 20 and 22 which may contain auxiliary enterprises such as locations for ticket sales, a waiting room, restaurants, and the like generally indicated at 24 and for gift shops or the like, generally indicated at 26. The housing 14 forms a cylindrical housing for the kaleidoscope 12 and incorporates a lower, generally horizontal support platform 28 constructed on suitable cross beams, to be described. The cross beams receive and support the base of the kaleidoscope 12 and the platform 28 provides the ceiling for a viewing chamber, or room 30, which will be described in greater detail hereinbelow.

Figure 2:
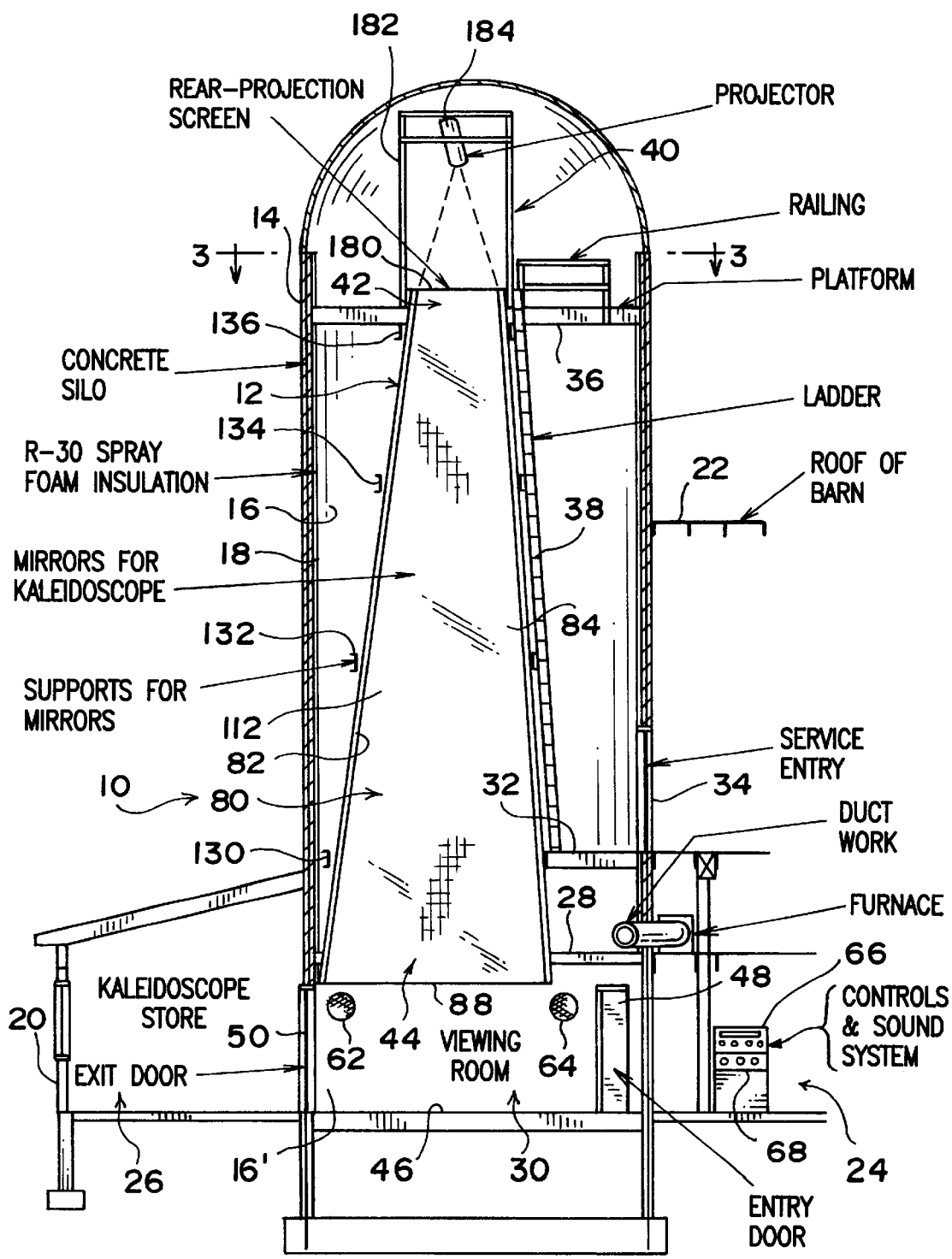
FIG. 2 is a cross sectional view of a preferred form of the entertainment system of the present invention, taken along line 2—2 of FIG. 3.

Also incorporated within the housing 14 is a lower service platform 32 adjacent a service entry door 34 which provides access to the interior of the housing for maintenance and service of the kaleidoscope and its related equipment. One or more additional service platforms may be provided within the housing 14, FIG. 2 illustrating an upper service platform 36 reached by way of a ladder 38 resting on the lower service platform 32. The upper platform provides access to optical projection equipment generally indicated at 40 and located at the object end 42 of the kaleidoscope. Although the illustrated embodiment provides a vertically-oriented kaleidoscope located above a viewing room and although other configurations may be used as pointed out above, the silo of the illustrated environment provides a unique environment for the entertainment system of the invention.

Viewing room 30 adjoins the viewing end 44 of the kaleidoscope 12, the viewing end 44 opening into the viewing room 30 and being sufficiently large to permit a relatively large number of individuals in the viewing room to see into the interior of the kaleidoscope 12 and to have a complete view of the optical images produced thereby. The viewing room may be adjacent to the end of the housing 14 or, in the illustrated embodiment, may be formed as the lower part of the housing wherein side walls 16' of the viewing room are a continuation of the side wall 16 of the housing. Although the housing and the viewing room are illustrated as being generally cylindrical, it will also be apparent that other cross-sectional shapes are available and that the housing 14 and the viewing room 30 need not have the same shape or dimensions.

The viewing room 30 includes a floor 46 and a ceiling, which may be the support platform 28, as well as entry and exit doors 48 and 50 to permit ingress and egress of individuals into and out of the viewing room. The viewing room preferably is sealed against the entry of light for improved viewing of kaleidoscope images.

Figure 4:
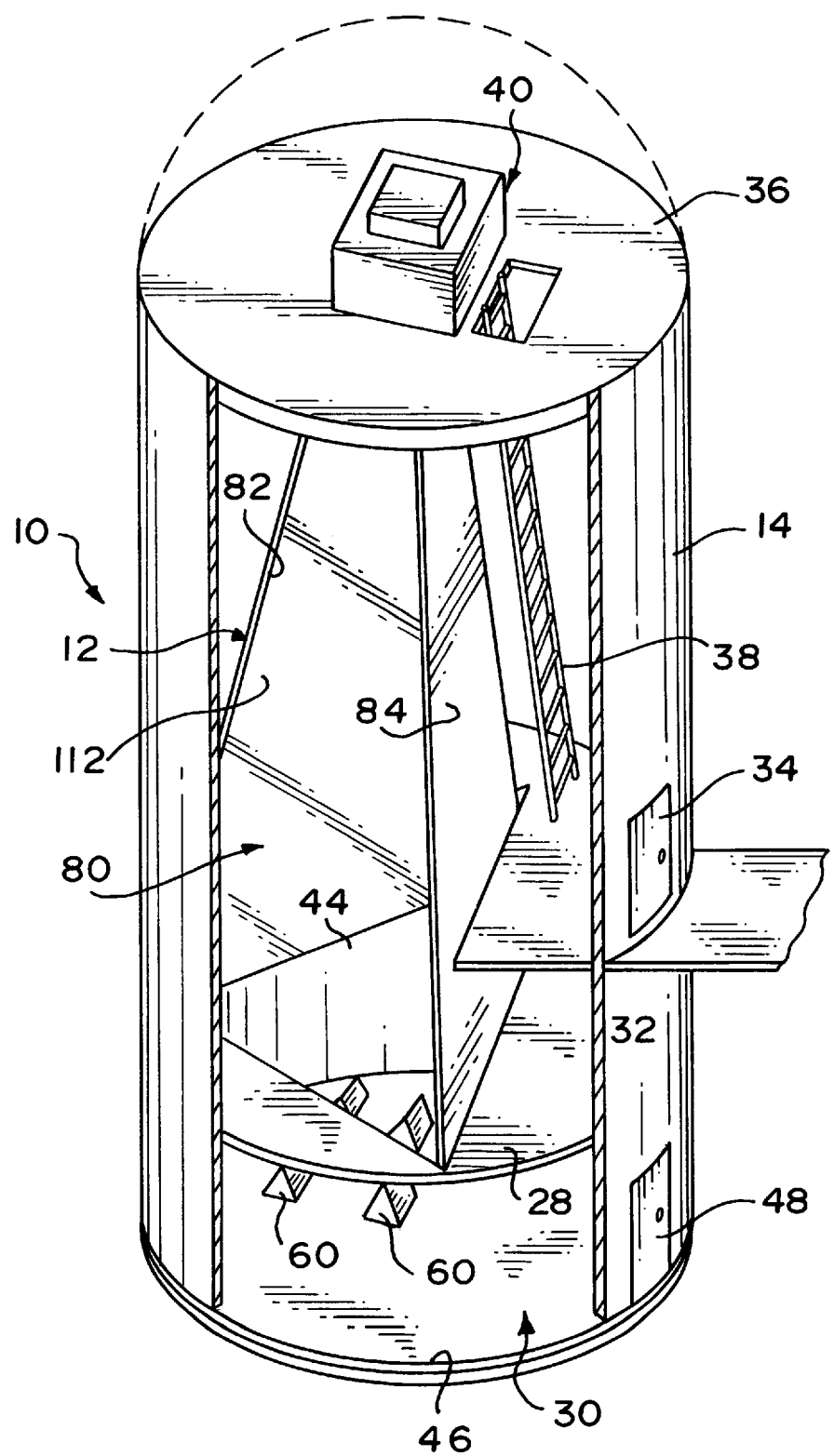
FIG. 4 is a perspective view, partially broken away, of the device of FIGS. 2 and 3.

As generally illustrated in FIG. 4, the viewing room 30 may include chairs or other supports for the convenience of viewers of the kaleidoscope. If the kaleidoscope is located vertically overhead, as in the illustrated embodiment, then the use of slightly reclined supports 60 is preferred. These supports may be in the form of padded boards of adjustable height, the boards being tilted slightly back with a cushion at the top end on which the viewer's head may rest. The viewer then stands in front of the padded board, leans back onto it, and adjusts the height of the headrest to provide comfortable support while the viewer looks up into the vertically oriented kaleidoscope 12.

The viewing room also incorporates suitable loudspeakers indicated at 62 and 64 for broadcasting music or other sounds coordinated with the operation of the optical image in the kaleidoscope. The loudspeakers may be connected to a sound source such as a tape player and amplifier 66 preferably located outside the viewing room. A control 68 for the optical projector 40 may also be provided at the same location.

The kaleidoscope 12 incorporates a viewing tube generally indicated at 80 which is fabricated from two or more tapered, elongated mirrored walls joined at their edges to form the tube through which the kaleidoscopic image is viewed. In the preferred form of the invention, the kaleidoscope viewing tube 80 includes three mirrored walls 82, 84 and 86 (FIG. 3) which are joined at their edges to form a viewing tube which is triangular in cross-section. A typical mirrored wall, such as the wall 82, is illustrated in FIG. 5 which is a view of the exterior side of the wall. It will be understood that walls 84 and 86 preferably are substantially identical to wall 82.

As illustrated, the wall 82 is constructed from a multiplicity of panels 86 which may be, for example, sheets of tongue and groove plywood assembled in edge-to-edge relationship. The panels are cut and assembled to form a generally trapezoidal mirror wall which, in an embodiment of the invention actually constructed and operated, had a base edge 88 approximately 15 ft. in length, a top edge 90 approximately 5 ft. in length, and opposed side edges 92 and 94 to produce a wall having an axial length of about 37½ ft. The panels 86 are rigidly secured to a suitable structural frame generally indicated at 96 and which may include, for example, longitudinal stringers 100, 102 and 104, top and bottom cross braces 106 and 108, and intermediate cross braces 110 spaced along the longitudinal, or axial, length of the wall to provide the required rigidity. It will be understood that the illustrated panel and frame structure is merely exemplary, and that any desired arrangement of these members may be provided to produce the required structural strength for the mirror wall. The frame members may be conventional metal construction studs or may be wooden studs, or a combination of the two, as desired.

The panels 86 are secured by the frame and by the tongue and groove construction to provide a substantially continuous, flat front surface to which is adhered a reflective surface such as the reflective material sold under the name Alpolic by Mitsubishi Kasei America, Inc. This material is a composite made by laminating a thermoplastic core between two sheets of aluminum alloy. One surface is electroplated with a layer of nickel and chromium to provide a mirror, while the opposite or back surface is coated with an acrylic resin. This composite material is adhesively secured to the front surface of the plywood wall to provide a highly reflective mirror surface 112. This material may be bonded to the plywood using standard adhesives and/or two-faced adhesive tapes such as those made for glass mirror installations.

Figure 3:
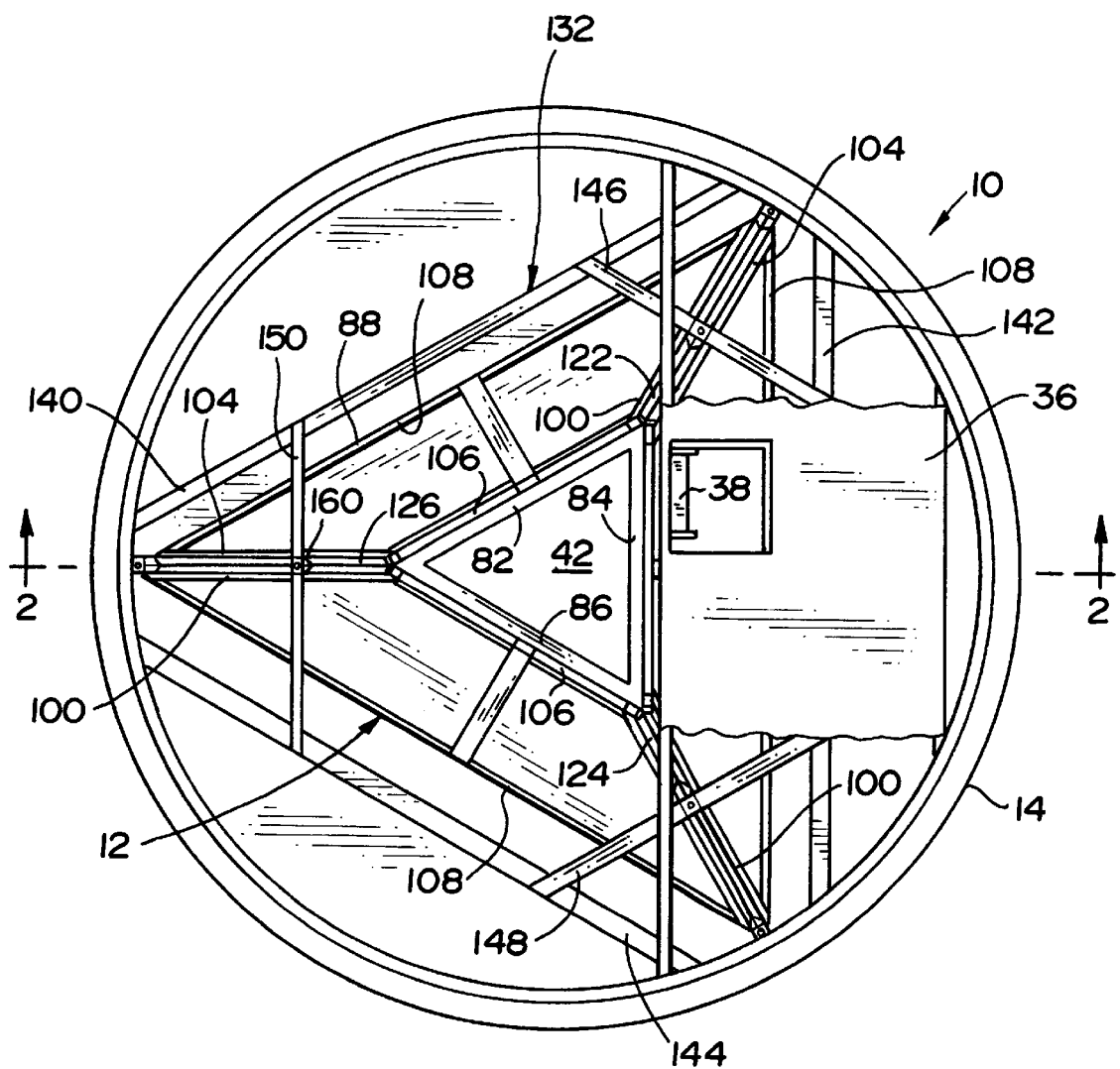
FIG. 3 is a top view of the structure of the invention, taken along line 3—3 of FIG. 2, showing the system with the roof, the projector and a part of the upper service platform removed for clarity.

The viewing tube 80 is fabricated by first assembling the three mirrored walls 82, 84 and 86 to form the triangular shape illustrated in FIG. 3. In assembling the viewing tube, it is extremely important that the angles between the walls be the same, and that the joint between the mirrored surface on one wall precisely meets and abuts the surface of the mirror on the next adjacent wall so that no spaces are left between them, and so the line of contact is straight from the top edge of the wall to the bottom edge to ensure a clear and seamless optical image. This may be accomplished, in accordance with the invention, by first producing a groove 114 in the face of each mirror along a selected edge of the mirror wall. Thus, for example, each wall may be grooved along the edge 92 (the left hand edge as viewed in FIG. 5) of the mirror wall as by routing through the mirror surface 112 into the underlying support panel 86 of wall 82. The groove 114 is formed along a precisely straight line from the top edge 106 to the bottom edge 108 of the wall 82, with the groove being angled and of sufficient depth to receive the corresponding abutting edge 116 of the next adjacent panel 84 and to ensure that the mirrored surface 112 of wall 82 contacts the surface 117 of mirror 118 on panel 84. This provides a surface to surface contact of the mirrors, with the routed groove ensuring a straight line contact at the abutting edges of the panels, as required to produce a seamless image.

The adjacent panels are secured at the correct angle 120 by an angled support brace 122. This support brace is securely fastened to the stringer 100 along edge 92 of panel 82 and to the stringer 104 along edge 94 of panel 84. If desired, the angled support brace may be secured first to the panel 82 and when the panels are moved into a correct adjoining position, the brace may be secured to panel 84 to hold the two in the correct angular relationship. The brace 122 is preformed to ensure the correct angle 120 between the panels 82 and 84.

In similar matter, the adjoining edges of panels 84 and 86 are secured by an angled support brace 124 and the adjoining edges of panels 86 and 82 are secured by an angled brace 126, as best illustrated in FIG. 3. These angled support braces secure the mirrored walls in their correct angled relationship with the mirrored surfaces being in close abutting relationship in the manner illustrated in FIG. 6 to provide the large-scale viewing tube of the present invention.

The viewing tube may be assembled within a housing, if desired, but in the embodiment illustrated in FIG. 1–4, the viewing tube preferably is assembled on the ground and then is lifted by a suitable crane and positioned within the vertical housing 14. The viewing tube is secured in the housing by at least one set of supporting beams, although three or four sets of such beams, diagrammatically illustrated at 130, 132, 134 and 136, in FIG. 2, are preferred. Only a single set 132 of supporting beams is illustration in FIG. 3 for clarity of illustrated, but it will be understood that the remaining sets will be similar to the illustrated set.

The set of supporting beams 132 illustrated in FIG. 2 includes three cross beams 140, 142 and 144 which are embedded in the sidewall of the concrete housing 14. These cross beams are located outside the perimeter of the lowermost edge 88 of the viewing tube so that the cross beams can be placed in the housing before the viewing tube is inserted. This allows the viewing tube to pass downwardly through the sets of supporting cross beams and to be positioned vertically within the housing. After the tube is in place, each set of cross beams receives three support beams, illustrated at 146, 148 and 150, these support beams resting on and being secured to corresponding cross beams. Thus, support beam 146 rests on cross beams 132 and 134 and is positioned adjacent the angled support brace 122. In similar manner, beam 148 is positioned adjacent angled support brace 124 and rests on beams 142 and 144, while support beam 150 is positioned adjacent angled support brace 126 and rests on cross beams 144 and 140.

The kaleidoscope tube is secured on the support beams 146, 148 and 150 by corresponding L-shaped support brackets such as the bracket 160 illustrated in detail in FIGS. 7 and 8. As illustrated, the support bracket 160 is secured to the angled support brace 126, as by welding, and includes a generally vertical leg portion 162 and a generally horizontal leg portion 164 which extends outwardly from the brace 126 and extends over the beam 150. A vertical bolt 166 extends through the horizontal leg portion 164 and is adjustably secured thereto by movable nuts 166 and 168. The bolt extends downwardly through an aperture in beam 150 and is adjustably secured therein, again by nuts 170 and 172. These adjustable supports permit precise alignment of the viewing tube within the housing 14 and support it rigidly against motion.

After the various supporting beam sets 130, 132, 134 and 136 are in place and the viewing tube has ben secured, the entry platform 32 is constructed, for example, on the supporting beams 130, and the upper platform 36 similarly is constructed on the upper supporting beams 136. Thereafter, the top of the viewing tube is covered by a rear projection screen 180, the screen being of a translucent material made for this purpose by the Stewart Screen Corporation of Ohio. A projector housing 182 is then positioned over the screen 180 and a projection-type video camera 184 is positioned in the housing to project images onto the rear of screen 180. The projector is operated by the control 68, described above, to project images on the screen which are visible from the viewing room 30 through the viewing tube and its image projected on the screen being directly visible through the triangular opening 42 at the top of the viewing tube, and its reflections being visible in the mirrored walls 82, 84 and 86, as is known in the kaleidoscopic art. The projection camera can produce any desired image and normally will be specially programmed to present a pleasing and artistic display in the kaleidoscope mirrors, the tapered reflective walls giving a spherical appearance to the image. The sound system is coordinated with the image being displayed so as to produce an audio and visual entertainment system.

Although the invention has been described in terms of a preferred embodiment, it will apparent that variations and modifications may be made without departing from the true spirit and scope thereof, as set forth in accompanying claims.

What is claimed is:

1. An entertainment system, comprising:

a housing having a side wall surrounding an interior space and having first and second ends;

a viewing chamber at said first end of said housing for receiving multiple viewers to observe an audio-visual display within the housing;

a kaleidoscope mirror tube within said interior space in said housing and having a viewing end and an object end, said viewing end being adjacent said first end and open to said viewing chamber, said viewing end being of sufficient size to enable said object end to be equally visible to multiple viewers in said viewing chamber;

an image at said object end of said tube and located at said second end of said housing, said image being reflected in said kaleidoscope mirror tube to produce a kaleidoscopic image display visible to the viewers in said viewing chamber; and a sound system in said viewing room coordinated with said image display.

2. The system of claim 1, further including support beams within said housing and supporting said mirror tube with said viewing end adjacent said viewing chamber.

3. The system of claim 2, wherein said mirror tube includes three mirrored walls, each mirrored wall including first and second elongated side edges and top and bottom edges; and angled braces securing adjacent mirrored walls in edge abutting relationships along said elongated side edges.

4. The system of claim 3, wherein each said mirrored wall comprises plural backing panels mounted on a support frame to produce a flat surface; and a reflective surface affixed to said flat surface of said backing panels to produce the mirrored wall.

5. The system of claim 4, wherein each said mirrored wall includes a groove along its first side edge on said reflective surface, said groove receiving a corresponding edge of an adjacent mirrored wall to provide a surface-to-surface contact between the mirror surfaces of adjacent mirrored walls to provide a seamless kaleidoscope image.

6. The system of claim 3, further including:

plural support beams within said housing, and support brackets on said angled braces engaging said beams.

7. The system of claim 6, wherein each said support bracket includes a generally vertical leg secured to an angled brace, and a generally horizontal leg including an adjustable connector extending to contact a corresponding support beam.

8. The system of claim 1, wherein said mirror tube is disposed vertically within said housing and above said viewing chamber.

9. The system of claim 8, wherein said housing is a silo.

10. The system of claim 8, wherein said housing is mounted above said viewing chamber and wherein said chamber includes multiple viewing supports to enable viewers to observe said kaleidoscope image.

11. The system of claim 10, further including an optical image at said object end of said tube for producing said image display.

12. The system of claim 11, further including a rear projection screen covering said object end of said tube, said projector producing said image display on said screen.

13. The system of claim 1, wherein said mirror tube comprises at least two walls, each wall having a bottom edge, first and second side edges, and a top edge and being generally trapezoidal in shape.

14. The system of claim 13, wherein the distance between said top edge and said bottom edge is about 37½ ft., said top edge has a length of about 5 ft., and said bottom edge has a length of about 15 ft., whereby said wall tapers inwardly from said bottom edge to said top edge.

15. The system of claim 14, wherein said mirror tube includes three substantially identical mirror walls forming a triangular tube, said walls forming a triangular tube, said walls having corresponding edges in abutting relationship to provide a tapered tube having a triangular cross-section.

* * * * *